Patented Apr. 12, 1938.

2,113,599

UNITED STATES PATENT OFFICE 2,113,599

LUBRICATING COMPOSITION AND PROCESS OF MAKING

John M. Musselman, Cleveland, Ohio, assignor to The Standard Oil Company (Ohio), Cleveland, Ohio, a corporation of Ohio No Drawing. Application December 31, 1934, Serial No. 759,954

18 Claims. (Cl. 87—9)

From the early days of petroleum lubricating oil, suggestions have been made to modify such oil by means of rubber. Such attempts have encountered the obstacles that either the rubber formed uneven stringy masses in the oil or did not suitably affect the viscosity of the oil, and the compounded oils were unable to stand up under usage in high temperature conditions. In accordance with the present invention however, it now becomes possible to attain compositions including petroleum oils and rubber, in smooth, homogeneous type and with high viscosity and of stability capable of withstanding high temperature application, such as in internal combustion engine usage, without breaking down and going to sludge.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The petroleum lubricating oils employed in accordance with the invention may be any of the petroleum portions customary or applicable in lubricating usage, as for instance lubricating oils ranging from 35 to 190 viscosity S. U. at 210° F. Desirably, such stocks as "neutral distillates" may be used with particular advantage. With the petroleum is incorporated rubber or caoutchouc. This may be of natural or synthetic origin, usually for instance Brazilian para, crepe, sprayed latex, etc. The rubber may be incorporated in the oil in any manner convenient. Desirably, it may be milled in or ground in, employing suitable disintegrating and agitating means, and preferably, a volatile solvent may be employed for initially dissolving the rubber. Hydrocarbon volatile solvents, for instance benzol, or chlor-compounds, for instance ethylene dichloride, chloroform, etc., may be employed for this, the rubber being dissolved in the volatile solvent by suitable grinding in a mixing device. With benzol, conveniently as much as 7 per cent. of rubber can be dissolved, and with mixtures of hydrocarbon solvents and chlor-compounds, as for instance mixtures of benzol 85 per cent and ethylene dichloride 15 per cent, as much as 25 per cent rubber can be conveniently got into solution. Rubber and petroleum alone are not very stable, particularly if high temperature conditions be incurred. Such conditions soon occasion a general break-down. I have found that a stable rubber-petroleum combination however, is had by the incorporation of an agent acting to stabilize such combination, among such notably being organic basic agents, as amines, the total combination then standing up well under drastic usage conditions, and maintaining its viscosity index. The amount of rubber incorporated in the petroleum oil is desirably only a relatively small amount, for instance from ½ to 5 per cent of rubber (dry basis) to lubricating oil. Where the rubber is introduced in the initial form of a solution in the volatile solvent of hydrocarbon or other type, a corresponding amount thereof is incorporated by suitable mixing.

The component which I designate as an agent for stabilizing, may be an organic basic agent, or amine; for instance diarylamines, poly primary amines, aldehyde amine condensation products; and among these naphthylamines and diamino-phenyl compounds are particularly advantageous, as for example phenyl-beta-naphthylamine, phenyl-alpha-naphthylamine, di-B-naphthyl-p-phenylenediamine, mixed ditolylamines, aldo-alpha-naphthylamine, acet-aldehyde-aniline condensation product, butylaldehyde-aniline condensation product, 4,4-diamino-diphenyl-methane, 2,4-diamino-diphenylamine, benzidine, 2,4-diamino-toluene, etc. The amount of stabilizer need not be large, and can range for instance from ½ to 5 per cent (on rubber dry basis). Such agent may be incorporated at a convenient stage, either initially in the rubber before its incorporation into the petroleum, or in the petroleum initially, or where a volatile solvent is employed, by mixture therewith.

Unless the rubber be properly depolymerized before its incorporation with the petroleum oil, it must be depolymerized in the oil, and desirably this is accomplished by stirring the mixture and heating to a depolymerizing temperature, for instance about 400° F., and for a time sufficient to disaggregate the rubber, for instance about 2 hours heating.

As an example: With a neutral stock from Mid-Continent petroleum having a viscosity of 200 S. U. at 100° F. and 45 at 210° F. and viscosity index 70, is incorporated 1 per cent of sprayed latex rubber and 0.01 per cent of phenyl-beta-naphthylamine, the mixture being well agitated in a mixer, and being heated to about 400° F. for 2 hours. The product is homogeneous and has a viscosity index 125, and a viscosity of 300 at 100° F. and 57 at 210° F.

As another example: With a lubricating stock from Pennsylvania petroleum, having a viscosity of 150 S. U. at 100° F. and 44 at 210° F., and viscosity index 100, is incorporated 1 per cent of Brazilian para rubber dissolved in benzol, and .02 per cent of 4,4-diamino-diphenyl-methane, and the mixture is stirred and heated to a temperature of 400° F. for about 2 hours. The volatile solvent benzol is thereby driven off. The product has a viscosity of 238 at 100° F., 55 at 210° F. and a viscosity index of 138.

Other modes of applying the principle of the invention may be employed, change being made as regards the details described, provided the features stated in any of the following claims, or the equivalent of such, be employed.

I therefore particularly point out and distinctly claim as my invention:—

1. A lubricant consisting of a lubricating oil maintained in liquid condition, depolymerized rubber in amount up to about 5 per cent, and a fractional per cent of an amine agent for stabilizing such combination.

2. A lubricating composition comprising a petroleum lubricating oil, a small amount of depolymerized rubber, and a small amount of diarylamine.

3. A lubricating composition comprising a petroleum lubricating oil, a small amount of depolymerized rubber, and a small amount of an aldehyde-amine condensation product.

4. A lubricating composition comprising a petroleum lubricating oil, a small amount of a depolymerized rubber, and a small amount of a poly-primary amine.

5. A lubricating composition comprising a petroleum lubricating oil, a small amount of depolymerized rubber, and a small amount of a naphthylamine.

6. A lubricating composition comprising a petroleum lubricating oil, a small amount of a depolymerized rubber, and a small amount of phenyl-beta-naphthylamine.

7. A lubricating composition comprising a petroleum lubricating oil, a small amount of a depolymerized rubber, and a small amount of aldo-alpha-naphthylamine.

8. A lubricating composition comprising a petroleum lubricating oil, a small amount of a depolymerized rubber, and a small amount of 4,4-diamino-diphenyl-methane.

9. A process of making a lubricant, which comprises incorporating in a petroleum lubricating oil rubber in amount up to about 5 per cent and a fractional per cent of an amine agent for stabilizing such combination, and heating to a rubber-depolymerizing temperature and maintaining in liquid condition.

10. A process of making a lubricant, which comprises incorporating in a petroleum lubricating oil not over 5 per cent of rubber and not over one-fourth of 1 per cent of a diarylamine, and heating to a rubber-depolymerizing temperature and maintaining a liquid condition.

11. A process of making a lubricant, which comprises incorporating in a petroleum lubricating oil a small amount of rubber and a small amount of an aldehyde-amine condensation product, and heating to a rubber-depolymerizing temperature.

12. A process of making a lubricant, which comprises incorporating in a petroleum lubricating oil a small amount of rubber and a small amount of a poly-primary amine, and heating to a rubber-depolymerizing temperature.

13. A process of making a lubricant, which comprises incorporating in a petroleum lubricating oil a small amount of rubber and a small amount of a naphthylamine, and heating to a rubber-depolymerizing temperature.

14. A process of making a lubricant, which comprises incorporating in a petroleum lubricating oil a small amount of rubber and a small amount of phenyl-beta-naphthylamine, and heating to a rubber-depolymerizing temperature.

15. A process of making a lubricant, which comprises incorporating in a petroleum lubricating oil a small amount of rubber and a small amount of aldo-alpha-naphthylamine, and heating to a rubber-depolymerizing temperature.

16. A process of making a lubricant, which comprises incorporating in a petroleum lubricating oil a small amount of rubber and a small amount of 4,4-diamino-diphenyl-methane, and heating to a rubber-depolymerizing temperature.

17. A lubricant consisting of a lubricating oil maintained in liquid condition, depolymerized rubber not exceeding 5 per cent, and an amine agent not exceeding one-fourth of 1 per cent.

18. A lubricant consisting of a lubricating oil maintained in liquid condition, depolymerized rubber not exceeding 5 per cent, and a diarylamine agent not exceeding one-fourth of 1 per cent.

JOHN M. MUSSELMAN.